United States Patent [19]

Sawhill

[11] Patent Number: 4,804,546

[45] Date of Patent: Feb. 14, 1989

[54] STABLE FAT SUSPENSION FEED SUPPLEMENT

[75] Inventor: J. Wallace Sawhill, Canoga Park, Calif.

[73] Assignee: Pacific Kenyon Corp., Long Beach, Calif.

[21] Appl. No.: 117,849

[22] Filed: Nov. 9, 1987

[51] Int. Cl.$^4$ ............................................. A23K 1/22
[52] U.S. Cl. ........................................ 426/69; 426/72; 426/74; 426/602; 426/658; 426/807
[58] Field of Search ............... 426/69, 72, 74, 623, 426/601, 630, 635, 807, 602, 658

[56] References Cited

U.S. PATENT DOCUMENTS 4,267,197  5/1981  Sawhill ............................. 426/69

OTHER PUBLICATIONS

Hawley "The Condensed Chemical Dictionary" Tenth Edition 1982, pp. 450-451.

Primary Examiner—R. B. Penland
Attorney, Agent, or Firm—Plante Strauss & Vanderburgh

[57] ABSTRACT

There is disclosed a stable thixotropic suspension of a fat in an aqueous liquid gel of a feed solution and a method for its preparation. The method comprises forming the liquid gel from a solution of sugar, protein or mixtures thereof, by incorporating ammonium phosphate in the solution in an amount sufficient to form the gel, adding water to reduce the concentration of the gel, and then adding fat. When fats with solidification temperatures above ambient temperature are added, the liquid gel is warmed to about the melting point of the fat and the fat is melted before mixing the fat with the liquid gel. Other water insoluble feed nutrients such as calcium carbonate, calcium sulfate, etc., or drugs such as monisan can also be suspended in the resultant gel. Water soluble feed nutrients such as urea, sodium bicarbonate, etc., can also be added.

8 Claims, No Drawings

STABLE FAT SUSPENSION FEED SUPPLEMENT

BACKGROUND OF THE INVENTION

1. Field of Invention

This invention relates to fat containing animal feed supplements and, in particular, to animal feed supplements formed as liquid gels and containing a substantial quantity of fat suspended in the gel.

2. Brief Statement of the Prior Art

The value of sugar-containing supplements as an energy source in animal diets has been recognized for many years. Phosphates have been added to the supplements as a source of dietary phosphorous; urea has been added to supply non-proteinous nitrogen; and fats have been included, as described in U.S. Pat. No. 2,793,952. Vitamins have been included in these supplements as described in U.S. Pat. No. 2,807,546.

Many attempts have been made to provide stable emulsions of fat in molasses with emulsifying agents such as phosolipids, lechithin, clays, gums and the like. These attempts have found only limited success. None of the emulsions can hold greater than about 10 weight percent fat in molasses. Additionally, the emulsions do not have adequate stability for dependable feed operations. This problem is particularly acute when drugs or medications such as moninsan are included in the fat containing supplement. When settling occurs, as it invariably has in the past, the animals are not provided with a uniform feed ration and imbalances in the feeding program result, causing poor feed efficiency and low gains. As a consequence, high content fat supplements have, heretofore, been unavailable for feed lot applications for dairy and beef cattle.

An example of an attempt to provide fat emulsions is that described in my prior patent, U.S. Pat. No. 4,267,197. The invention disclosed in that patent is the formation of a thixotropic gel carrier for powdered solid feed nutrients such as limestone flour, calcium phosphate and calcium sulfate. This gel is formed with ammonium phosphate that is added to a diluted sugar solution. In my aforementioned patent, I disclose that fat can be also included in the formulation by emulsifying the fat in the molasses or sugar solution, using various emulsifiers. The maximum amount of fat which can be held in an emulsion prepared by this technique for extended storage is about 10 weight percent, although greater amounts can be temporarily held in the supplement. Additionally, the liquid gels disclosed in this patent have relatively high molasses contents, greater than about 60 Brix. Gels having greater water contents are desirable because of lower ingredient costs and because greater amounts of other nutrients such as fat or limestone can be incorporated in the more dilute gels.

Liquid feed supplement have also been prepared by the addition of water, ammonium polyphosphate and calcium chloride to molasses, as described in U.S. Pat. No. 3,962,484. If the calcium chloride is added to molasses before the ammonium polyphosphate, excessive gelling and precipitation will occur, as reported in depth in: "Calcium Chloride in Liquid Feed Supplements" NFIA Counter Oct. 14–16, 1973, pp 115–129, by Grosso et al, the inventors named in the aforementioned patent.

It is also known that solid feed supplements can be obtained by the addition of certain gelling agents to molasses. This practice has resulted in commercial acceptance of "poured chemical blocks". The poured chemical blocks are either soft blocks formulated with lime and phosphoric acid at an acidic pH (3.0 to 6.5) as described in U.S. Pats. Nos. 4,027,043 and 4,160,041, or hard blocks in which the formulation contains substantial amounts of alkaline additives, usually magnesium oxide, as described in U.S. Pats. No. 4,431,675; 4,171,385; 4,171,386; and 4,265,916; New Zealand Pat. No. 170505; Australian Pat. No. 438,073; and U.K. Pat. No. 1,356,954. Hard blocks prepared by the methods of the latter patents have pH values from 9.5 to 10.5.

BRIEF STATEMENT OF THE INVENTION

This invention comprises a method for the preparation of a stable, thixotropic liquid suspension fat in a liquid gel. Water soluble feed ingredients, such as sodium carbonate and bicarbonate can be dissolved in the gel. Also, if desired, other water-insoluble feed ingredients such as calcium carbonate, calcium sulfate, cottonseed meal, bone meal, etc., as well as water-insoluble drugs such as monenisn can be suspended with the fat. The liquid phase of the suspension is an aqueous liquid gel of a feed solution.

The thixotropic liquid is prepared by incorporating ammonium phosphate, preferably ammonium polyphosphate in the feed solution in an amount from 0.5 to 12.5 weight percent based on the final supplement while maintaining the concentration of the feed solution at or above 60° Brix and thereafter adding water to provide a water content in the final supplement from 20 to 50 weight percent. This amount of water will reduce the viscosity of the liquid gel to a value from 1500 to 4000 cps. In instances where fats having free fatty acid contents of 25 percent or greater are used, the proportion of water is increased to reduce the viscosity of the gel to about 800 cps. The resulting gel is used as a carrier for a fat by adding liquid fat to the liquid gel. Fats which melt above ambient temperature can be used by melting the fat and warming the liquid gel to approximately the melting point of the fat, and then mixing the fat into the warmed liquid gel. The gel will suspend large quantities of the solid fat, e.g., up to about 40 weight percent, based on the supplement.

The resulting fat suspension is stable for prolonged periods of storage and over an extended temperature range. The feed supplement contains no emulsifiers, gums or solid dispersing agents and is entirely composed of feed nutrients and water.

The fat suspension will be a stable thixotropic suspension having a stirred viscosity from 1400 to about 3500 cps. and an at-rest viscosity from 10,000 to about 30,000 cps. It will remain liquid even at low winter temperatures and can be inhibited against freezing at temperatures as low as −10° F. by addition of soluble salts such as from 1 to 12 weight percent sodium chloride, ammonium sulfate, etc.

THE FEED SOLUTION

The animal feed supplement is prepared from a commercial aqueous feed solution. Generally, this will be a sugar solution which will contain from 40 to 85 percent solids with the balance being water. A variety of sugar solutions can be used; however, molasses is a preferred source. The feed solution should be present in the feed supplement at a concentration of from 25 to about 75, preferably from 35 to about 70, weight percent.

The water content of molasses is from 15 to about 35 weight percent, depending on the type of molasses. The molasses can be any sugar containing molasses such as cane or Blackstrap Molasses, beet molasses, converted molasses, wood sugar molasses, hydrosyrup, and the like.

Cane molasses, which is a by-product from the extraction of sucrose from sugar cane, is the most widely available molasses. It is commercially available at a standard 79.5° Brix concentration which has a water content of about 21 weight percent and a sugar content of 50 weight percent. Beet molasses, which is a by-product from the production of sucrose from sugar beets is also available at many locations in this country, particularly in the northern and mid-western states. It is also marketed at a standard 79.5° Brix concentration.

Another sugar solution that can be used is whey, a by-product of the dairy industry. The whey is a dilute solution of lactoalbumin, lactose, some fats, and the soluble inorganics from the parent milk. The whey is condensed and spray dried to a powder or is condensed to about 40 to 60 percent solids, the balance being water and preserved. A typical analysis is as follows:

TABLE 2

| Composition of a Typical Dried Whey | |
|---|---|
| Protein | 12.0% |
| Fat | 0.7% |
| Lactose | 60.0% |
| Phosphorous | 0.79% |
| Calcium | 0.87% |
| Ash | 9.7% |

A third source of a useful sugar solution is the pulp and paper industry which produces large quantities of by-product lignin sulfonates from wood during the sulfite pulping process. After the separation of lignin, the acidity of the resultant solution is neutralized with an ammonium or alkali metal bisulfite compound or base to form the following organic salts:

Ammonium lignin sulfonate;
Sodium lignin sulfonate; and
Magnesium lignin sulfonate.

A typical analysis of a commercially available ammonium lignin sulfonate solution is as follows:

TABLE 3

| Typical Analysis of Ammonium Lignin Sulfonate | |
|---|---|
| Percent Solids | 50% |
| Specific gravity | 1.237 |
| pH, 10% solution | 3.5 |
| Sugars - expressed as glucose | 16.0% |
| Tannin content | 45.0% |
| Available ammonia | 3.0% |
| Sulfur | 6.0% |
| Ash | 1.0% |

The sugar solution is the energy ingredient of the supplement. Sources of other metabolizable organic values can be used to repace a portion of the sugar solutions. Examples of such other useful energy ingredients sources include condensed and dehydrated molasses solubles which are obtained from the fermentation of molasses to produce chemicals such as ethanol, citric acid, glutamic acid, etc. A material rich in metabolizable values, known as condensed molasses solubles, is obtained by evaporation of the residue from this fermentation. This material can also be dehydrated to dryness and the resultant dry solid is also a useful additive. Another very useful feed solution is a condensed or concentrated fermented corn extract, which is sometimes referred to as corn steep liquor or mazofer. This material is obtained by concentrating the liquid remaining after steeping corn in an aqueous sulfur dioxide solution and allowing it to ferment. These materials can have from 40 to 100 percent solids and contain, on a dry weight basis, from 1 to 15 percent sugar and contain signivicant contents of protein, e.g., from 5 to about 25 percent.

Any of the aforementioned sugar solutions can be mixed with any other sugar solution, or used alone, to obtain a base solution which is used to form the liquid gel carrier. Also, some or all of the sugar solution can be replaced with the aforementioned feed solutions (condensed molasses solubles or corn steep liquor), depending on the amount of natural protein which is desired in the final supplement. The gel carrier is formed from a solution which has a Brix value of 60° or greater by the addition of ammonium phosphate to the solution.

When the ammonium phosphate is added to a solution which as a Brix value below 60°, there is a detrimental effect on the viscosity of the resulting gel. Since the Brix value of the final supplement is far less than 60°, this method thus requires that the required quantity of water be added usually in two increments; some of the water being added with the ammonium phosphate and the remainder being added after the gel has formed, but before addition of the fat.

THE GELLING AGENT

The ammonium salt which is incorporated in the aforementioned sugar solution to effect gelling thereof can be any ammonium salt of orthophosphoric or polyphosphoric acids. Examples of suitable salts are monoammonium orthophosphate, diammonium orthophosphate, ammonium polyphosphate, e.g., ammonium pyrophosphate, ammonium tripolyphosphate.

The ammonium salt gelling agent which is employed is preferably of mono ammonium and di-ammonium phosphates in approximately equal molar proportions. A suitable example of a commercially available product for this purpose is the ammonium phosphate solution available under the designation "10-34-0" which comprises a solution of mixed ammonium orthophosphates and polyphosphates containing 10% nitrogen in the form of ammonium and 34 weight percent phosphorous, calculated as $P_2O_5$ present in the phosphate. This solution is commonly obtained by the ammonia neutralization of superphosphoric acid, a mixture of principally orhophosphoric acid with approximately 20 weight percent of the phosphorous present as pyro and tripolyphosphoric acids.

The ammonium phosphate can be added in amounts sufficient to provide from 0.1 to 2.5 weight percent phosphorus in the final supplement. This corresponds to 0.5 to 12.5 weight percent ammonium phosphate. The ammonium phosphate has a maximum gellation effect at about 5 weight percent, and amounts greater than about 6 weight percent are less effective in gelling the solution than amounts from 1.0 to 5 weight percent. Accordingly, when the formulation requires a phosphorus content in excess of 1.0 weight percent, it is preferred to use only the amount of ammonium phosphate that exhibits maximum gelation, and to add insoluble sources of phosphorus such as dicalcium phosphate to achieve the required phosphorus content.

THE FAT INGREDIENT

An animal-edible, normally solid fat is added to the viscous liquid gel. For this purpose, normally solid animal edible fats are the most widely available and are preferred. These fats have high melting points in excess of ambient temperatures, i.e., in excess of 65°–80° F. The solid fat is heated sufficiently to melt the fat and the resultant, hot fat liquid is then added to the viscous gel which is also warmed to the fat melting temperature, while stirring the mixture sufficiently to disperse the fat intimately through the viscous gel carrier. No emulsifying or stabilization agent is necessary, for if the fat is adequately dispersed into the liquid gel carrier, the fat subdivides into small particles which solidify and form a suspension in the viscous liquid carrier. Acidulated fats, which can have free fatty acid contents of 40% to 70% can also be used. These fats are often liquid at room temperatures. With high fat content suspensions (those containing over 20% fat) the quantities of water in the supplement must be increased when the fat contains quantities of free fatty acids in excess of 25 weight percent, as these fats tend to increase the viscosity of the final product to a greater extent than do fats with low contents of free fatty acids. The fat is mixed with the diluted liquid gel at concentrations sufficient to provide from 5 to 40 weight percent fat in the final supplement. Preferably the fat is added at concentrations from 12 to about 35 weight percent fat.

POWDERED INSOLUBLE FEED NUTRIENT

If desired, a powdered water insoluble nutrient can also be added to the liquid gel. This can be any animal feed nutrient which is substantially insoluble in water. Examples of desirable additives that can be suspended in the gelled sugar solution prepared by the invention comprise calcium carbonate, magnesium carbonate, calcium sulphate, or calcium phosphate. All of the aforementioned comprise inorganic nutrients and sources of elements needed for a balanced diet such as calcium, magnesium or phosphorous.

Other water insoluble nutrients in powder form that can be added include those which can supply the animal's protein requirements such as: dried blood or meat meal from rendering plants which also serve as a phosphorous source, cottonseed meal, soymeal, dehydrated alfalfa, dried and sterilized animal and poultry manure, fishmeal, powdered egg, and dried fish solubles. The fish solubles is a dried concentrate of the cooking water from a fish cannery which has a very high protein content.

The water insoluble solid animal feed nutrient is added to the gel in powdered form. Preferably, the solid is of a size range passing a 20 mesh U.S. standard screen and, most preferably, of a size range passing a 100 mesh standard U.S. screen. The solid can be powdered to any further degree of fineness and the limit on the minimum particle size is controlled only by the economics and cost of finally subdividing the solid material. Typically a size range processing a 100, and retained on a 300, U.S. standard screen can be used.

PROTEIN EQUIVALENT INGREDIENTS

When the feed supplement is intended for consumption by ruminants, a non-protein nitrogen compound such as urea, buiret or mono or di-ammonium phosphate can be used to supply the protein nitrogen dietary requirements of the animals.

Generally, the feed supplement should not contain more than about 40 weight percent equivalent protein content from a protein or non-protein nitrogen compound and the upper limit for the concentration of urea in the supplement corresponds to this maximum equivalent protein content. When molasses is used as a sugar source, the maximum amount of urea can be reduced by the amount of nitrogen contributed by the molasses (about 1 to 3 weight percent) to the preferred, maximum 12 weight percent limit based on the feed supplement. A typical ruminant feed would, therefore, contain from 5 to about 15, preferably from 7 to about 12 weight percent urea as a source of non-protein nitrogen.

Useful animal edible fats are the edible fats and oils from animal and vegetable sources. The supplement prepared by the method of the invention can contain up to about 35 weight percent, based on the supplement weight, of edible fat. Preferably, the composition has from 13 to about 30 weight percent fat. These fats are mono, di or tri-glycerides of various fatty acids such as stearic, palmitic, oleic, linoleic, lauric, etc. Useful fats and oils can also include complex lipids such as the phospholipids, e.g., fatty acid esters of glycerol phosphate or lecithins, which also contain nitrogen bases such as choline. The fats are commonly identified by source, and suitable fats which can be employed include the oils, tailings or residues of the following: soybean oil, cottonseed oil, sesame oil, olive oil, corn oil, tallow, fish oil, coconut oil, palm oil, etc. Preferably, relatively inexpensive sources of fats are employed such as the yellow grease compositions which are reclaimed restaurant fats and greases, acidulated soap stocks or acidulated fats and oils. The fat ingredient can also contain an antioxidant in an effective amount to inhibit oxidative degradation of the fat, e.g., from 0.01 to about 1 weight percent butylated hydroxyanisole, butylated hydroxytoluene, 4-hydromethyl-2, 63di-tert-butylphenol, etc.

OTHER FEED INGREDIENTS

Other feed ingredients which can also be added to the supplement include ammonium sulfate, sodium chloride or potassium chloride in an amount from 0.5 to 15 weight percent of the supplement. These salts are particularly desirable additives for cold weather applications as they will reduce the freezing point of the suspension to appropriately low values, e.g., 0° F. and even to −10° F.

In some applications it may be necessary to add microicides such as propionic acid, benzoic acid, or sodium bisulfite to stabilize the supplement against bacteria and yeasts. In those applications, propionic acid at a concentration of 0.1 to 0.5 weight percent, or sodium bisulfite at a concentration of 0.5 to 1.0 weight percent, are effective in preventing growth and development of bacteria and mold.

The content of minerals, as well as other ingredients such as drugs, vitamins, etc., can be varied as desired for specific applications. Examples of various minerals are manganese, iodine, zinc, copper, cobalt and iron compounds. In some specific applications, a high content mineral supplement is desirable, e.g., containing from 6 to 10 percent phosphorus, 5 to 8 percent calcium and from 0.1 to 2 percent of mineral salts, added as finely divided powders. These salts can be water insoluble salts such as dicalcium and tricalcium phosphate or can be water soluble salts such as monoammonium phosphate. Examples of vitamins include Vitamin A, Vitamin D, and Vitamin E.

Examples of useful drugs are: growth promoting food additives or drugs such as monensin and sodium monensin, commercially available under the designation Rumensin from Eli Lilly Co.; chlorotetracyline and sulfamethiazine; and mixtures of chlorotetracyline and sulfamethiazine; etc. Other useful drugs include antibloat and antihelmintic agents as well as insect control agents. The aforementioned materials are used in effective concentrations for the desired result, e.g., drugs are used at concentrations from 0.1 to about 1.0 weight percent. The minerals are usually used in similar concentrations, but are often expressed in amounts from 3 to about 500 milligrams per pound and vitamins are frequently expressed from 10 to about 50,000 units per pound.

THE METHOD

The order of addition of the ingredients of the supplement is significant, as the required quantities of water and ammonium phosphate gelling agent should be added to the sugar solution and thoroughly dispersed therein to form the viscous liquid gel prior to the addition of all the required amount of water and prior to the addition of the melted fat ingredient. If all the water is added to the sugar solution before or during the addition of the ammonium phosphate, the thixotropic properties of the liquid gel are diminished or, in some cases, a liquid gel cannot even be obtained. Accordingly, it is important to form the gel in sugar solutions having at least 60° Brix. This insures that the carrier is available as a thixotropic medium that suspends the fat particles as they are formed in the supplement upon the addition of the melted fat. When the fat is added to the molasses before formation of the dilute, viscous gel, the fat particles cannot be completely dispersed and readily settle and separate from the carrier.

Thereafter the other feed ingredients are added to the resulting thixotripic suspension of fat in a viscous liquid gel carrier.

The invention will be described with reference to the following examples which serve to illustrate the practice of the invention and demonstrate its results.

EXAMPLE 1

A stable thixotropic fat suspension was prepared in a one-liter laborabory mixer having a variable speed stirrer operated at about 200 rpms. After each addition of ingredients, described below, the resulting mixture was stirred for 5 minutes before proceeding to the next step. The following formulations were prepared:

| Formulation Description | 1 Low Fat | 2 High Fat |
| --- | --- | --- |
| Water | 8.7 | 25.0 |
| Molasses | 47.0 | 28.0 |
| Liquin Sulfonate | 15.0 | — |
| NaCl | 1.9 | 1.9 |
| MgSO4 | 1.0 | 1.0 |
| 10-34-0 | 7.0 | 7.0 |
| Fat[1] | 10.0 | 30.0 |
| Urea | 8.2 | 8.2 |

[1]A mixture of animal and vegetable fats having a solidification temperature of 100° F.

The ammonium phosphate (10-34-0) was mixed with the molasses and lignin sulfonate in formulation 1, and with the molasses in formulation 2, to form aqueous gels. Water was then added, in the indicated quantities, and the resulting liquid gels were warmed to a temperature of 90° F. A dry mixture of the water soluble ingredients (NaCl, MgSO4 and urea) was next added while maintaining the temperature. The fat was then melted and added to the warm liquid gels.

Each of the resultant fat suspensions were poured into two laboratory containers which were covered and stored at 35° F. and at 70° F. The containers were inspected after one day and found to be stable fat suspensions with no separation.

EXAMPLE 2

The procedure of Example 1 was repeated for both formulations, however, the order of addition of the ingredients was changed and the ingredients were mixed at room temperature (70° F.). The urea and water ingredients were mixed together and then mixed with the molasses and lignin sulfonate, or with molasses only. The dry salts (NaCl and MgSO4) were then dissolved in the liquid mixtures, and then the ammonium phosphate was added to form a gel. The fat was then melted and added to the liquid gels, which were at room temperature.

Each of the resulting fat suspensions were also poured into two containers that were stored for one day at 70° F. and 35° F. After one day, it was observed that the fat in the high fat formulations had separated into a curd-like phase.

A comparison to Example 1 reveals that when the gel is formed in the ammonium phosphate before the addition of water, the resultant gel can be diluted extensively with water and will still be effective in suspending 30 weight percent fat. In contrast, the gel which is formed after the molasses is diluted with approximately an equal weight of water (formulation 2) before addition of the ammonium phosphate fails to suspend 30 weight percent fat.

EXAMPLE 3

A series of fat-containing supplements were prepared with the laboratory equipment to demonstrate the concentration of ammonium phosphate most effective as a gelling agent. The supplements which were prepared had the following formulations and properties:

TABLE #1

| | Formulas, Ingredients & Data at Make Up | | | | | | | |
| --- | --- | --- | --- | --- | --- | --- | --- | --- |
| Sample No: | 1 | 2 | 3 | 4 | 5 | 6 | 7 | 8 |
| Ingredients | | | | | | | | |
| (a) Molasses | 625 | 615 | 432 | 385 | 300 | 380 | 390 | 390 |
| (b) 10-34-0[1] | 0 | 5 | 16 | 30 | 70 | 105 | 136 | 165 |
| (c) water | 75 | 60 | 250 | 240 | 330 | 215 | 175 | 140 |
| (d) fat[2] | 300 | 300 | 300 | 300 | 300 | 300 | 300 | 300 |
| Properties | | | | | | | | |
| Brix[3] | 70 | 70 | 50 | 50 | 40 | 50 | 55 | 60 |
| Viscosity of Gel | 1200 | 900 | 900 | 1500 | 1500 | 1800 | 1500 | 1200 |
| Viscosity + 30% fat | 1800 | 2400 | 1500 | 2100 | 2100 | 2700 | 2100 | 2100 |
| % Phosphorus | 0 | 0.07 | 0.23 | 0.43 | 1.0 | 1.5 | 2.0 | 2.4 |

[1]solution of 70% solute
[2]70% vegetable and 30% animal fat; 75° titer value.
[3]Brix of the liquid gel, before fat addition.

The data indicates that the maximum gelation occurred with Samples 3-5 which contained from 1 to about 5 weight percent ammonium polyphosphate, on a dry weight basis. With these samples, the water could be added in about equal weight amounts to the molasses (Example 5 was 55% water). The addition of greater proportions of ammonium polyphosphate in Samples 6 through 8 caused a reduction in the amount of water which could be added while maintaining the gel viscosity at the desired value of about 1500 cps.

The fat was heated to 130° F. and blended into the viscous gels which were maintained at 85° F. Each sample of fat-containing supplement was divided into three portions. These portions were stored in compartments maintained at 70° F., 35° F., and 5° F. and after one day of storage, the viscosities of all portions were determined. The at-rest and stirred viscosities are reported in the following table:

TABLE #2

| | | \<br>Stability of Fat Mixes at 3 Temperatures | | | | | |
|---|---|---|---|---|---|---|---|
| | | 70° | | 35° | | 5° | |
| SN # | % P | At Rest | Mixed | At Rest | Mixed | At Rest | Mixed |
| 1 | 0.00 | | | | | | |
| 2 | .07 | | | | | | |
| 3 | .23 | 3900 | 1500 | 2700 | 2700 | 28000 | 4500 |
| 4 | .43 | 3300 | 2100 | 12000 | 3000 | 12000 | 3600 |
| 5 | 1.0 | 3600 | 2400 | 10000 | 300 | 12000 | 3600 |
| 6 | 1.5 | | | | | | |
| 7 | 2.0 | 4500 | 2100 | 9000 | 3000 | — | — |
| 8 | 2.4 | 5400 | 2400 | 10000 | 3000 | — | — |

The data evidence very high stability of the fat suspensions at high fat contents. The fat suspensions remain fluid and pumpable even at low storage temperatures such as typically experienced in winter applications.

The invention has been described with reference to the illustrated and preferred embodiments. It is not intended that the specific examples limit the description of the invention. Instead, the invention is intended to be defined by the steps, and their equivalents, set forth in the following claims.

I claim:

1. A method of preparing stable, thixotropic suspensions of fat suitable for use as feed supplements for domestic animals which consists essentially of:
    (a) mixing ammonium phosphate with an aqueous sugar solution having a concentration of at least 60° Brix, with the amount of ammonium phosphate being from 0.5 to 12.5 weight percent of the final supplement and sufficient to form a liquid gel with the sugar solution;
    (b) adding water to the liquid gel in an amount from 20 to 50 weight percent of the final supplement to form a diluted gel; and
    (c) warming an animal-edible fat to above its melting temperature and mixing said fat into said diluted liquid gel at a concentration 12 to 35 weight percent of the final supplement, with said mixing of fat being performed in the absence of fat emulsifiers to produce an emulsifier-free feed supplement.

2. The method of claim 1 including the step of adding from 1 to 15 weight percent urea to the supplement.

3. The method of claim 1 including the step of adding from 1 to 12 weight percent of a water soluble salt to the supplement.

4. The method of claim 1 including the step of adding vitamins and trace minerals in amounts of 0.1 to 1 weight percent to the supplement.

5. The method of claim 1 including the step of adding from 0.01 to 1 weight percent nonensin to the supplement.

6. The method of claim 1 wherein said sugar solution is cane molasses.

7. The method of claim 1 wherein the fat is added at a concentration from 12 to 35 weight percent.

8. The method of claim 1 wherein the fat is an acidulated fat containing greater than 25 percent free fatty acids and including the step of adding sufficient water to the liquid gel to reduce its viscosity to a value from about 800 to 1200 cps. before addition of said fat.

* * * * *